(12) United States Patent
Baek

(10) Patent No.: US 8,843,164 B2
(45) Date of Patent: Sep. 23, 2014

(54) METHOD FOR CREATING SHORT MESSAGE AND PORTABLE TERMINAL USING THE SAME

(75) Inventor: Hyun Jung Baek, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 631 days.

(21) Appl. No.: 12/702,462

(22) Filed: Feb. 9, 2010

(65) Prior Publication Data

US 2010/0248757 A1 Sep. 30, 2010

(30) Foreign Application Priority Data

Mar. 31, 2009 (KR) .................... 10-2009-0027414

(51) Int. Cl.
*G06F 17/27* (2006.01)
*G06F 3/02* (2006.01)
*G06F 3/0488* (2013.01)
*G06F 3/023* (2006.01)
*H04M 1/725* (2006.01)

(52) U.S. Cl.
CPC ...... *H04M 1/72552* (2013.01); *H04M 2250/70* (2013.01); *G06F 3/0488* (2013.01); *G06F 3/0237* (2013.01); *H04M 2250/22* (2013.01); *G06F 17/276* (2013.01)

USPC ............... 455/466; 455/414.2; 455/154.2

(58) Field of Classification Search
CPC .... G06F 17/276; G06F 3/0237; G06F 3/0488
USPC ............ 455/466, 414.2, 154.2; 707/728, 758; 715/210, 811, 816
See application file for complete search history.

(56) References Cited

U.S. PATENT DOCUMENTS

| | | | |
|---|---|---|---|
| 2003/0073451 A1* | 4/2003 | Kraft | 455/466 |
| 2006/0025091 A1* | 2/2006 | Buford | 455/154.2 |
| 2007/0273648 A1* | 11/2007 | Fussinger | 345/161 |
| 2008/0243737 A1* | 10/2008 | Rieman et al. | 706/18 |
| 2009/0009367 A1* | 1/2009 | Hirshberg | 341/22 |
| 2009/0186603 A1* | 7/2009 | Usami et al. | 455/414.2 |

* cited by examiner

*Primary Examiner* — Qun Shen
(74) *Attorney, Agent, or Firm* — Cha & Reiter, LLC.

(57) ABSTRACT

A method for automatically creating a short message and a portable terminal using the same includes extracting at least one word expected to be input from a database provided in the portable terminal when a message creation menu is selected. At least one input expected word that has been extracted is then displayed. At least one word that is recognized is selected from among the displayed at least one input expected word; and inputting the selected word to a text message creation window. A user can create a short message without having to input words one-by-one through a keyboard.

19 Claims, 11 Drawing Sheets

FIG. 4a

| |
|---|
| OK, YUP, GOT IT, HOME, YES, I GOT IT, NOPE, OKAY, CALL, THANK YOU |
| HAVE(HAS, HAD, DON'T HAVE) |

FIG. 4b

| | |
|---|---|
| OK, YUP, GOT IT, NO, YES, I GOT IT ||
| ME, YOU, MOM ⋯ | ME, YOU, MOM |
| WHEN, AT WHAT TIME ⋯ | TOMORROW, TODAY, 12 O' CLOCK |
| WHO ⋯ | HOME, OFFICE, SCHOOL |
| ⋮ ||
| How are you? | I'm, fine, think, you |
| Do, Cam, May | Yes. NO |
| ⋮ ||
| HAVE(HAS, HAD, DON'T HAVE) ||

FIG . 4c

| | | | |
|---|---|---|---|
| 010<br>-8856<br>-7776 | OK, YUP, GOT IT | | |
| | WHO | ⋯ | ME |
| | WHEN,<br>AT WHAT TIME | ⋯ | TOMORROW |
| | WHERE | ⋯ | HOME |
| | | | ⋮ |
| 010<br>-9876<br>-4321 | OK, LOVE, YUP | | |
| | WHO | ⋯ | YOU |
| | WHEN,<br>AT WHAT TIME | ⋯ | TODAY |
| | WHERE | ⋯ | SCHOOL |
| | | | ⋮ |

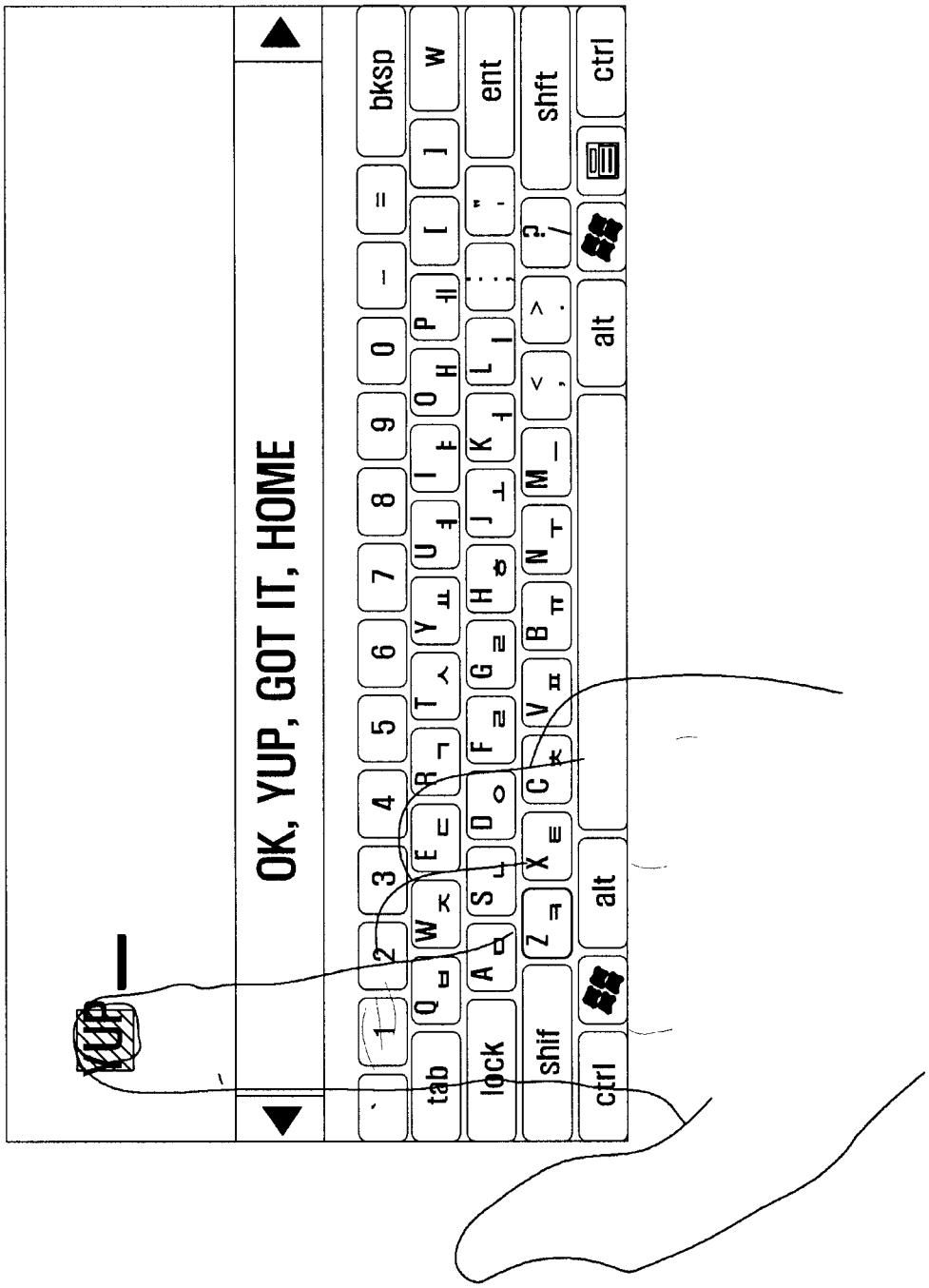

METHOD FOR CREATING SHORT MESSAGE AND PORTABLE TERMINAL USING THE SAME

CLAIM OF PRIORITY

This application claims the benefit of priority under 35 U.S.C. §119 from Korean patent application No. 10-2009-0027414 filed on Mar. 31, 2009, the contents of which are herein incorporated by reference in its entirety.

BACKGROUND OF THE INVENTION

1. Field of the Invention

The present invention relates to portable terminals using short messaging. More particularly, the present invention relates to a method for creating a short message using short message service (SMS) by a portable terminal.

2. Description of the Related Art

With the relatively recent advent of portable terminals, such devices are now considered by many to be an essential part of modern society. Portable terminals provide various functions for the convenience of the user, into addition to a voice call function. A short message service (SMS), now one of the main functions of a portable terminal, is widely used for communication between terminal users, and can be referred to as "text messaging". Occupying communication channels in non-real time, the SMS is advantageous in that its communication costs are low and channel occupancy time is brief. Also, while it is preferable to deliver the message as soon as possible, there is no requirement for a real-time communication. In addition, the SMS is advantageous in that accurate content can transferred via a simple sentence and a message can be recorded and stored so as to be repeatedly read, forwarded, etc. With such user convenience, the usage rate of the SMS portable terminal users is increasing.

In general, a user creates a message by using a keypad or a touch screen of a portable terminal. The keypad and the touch screen are configured as a keyboard in a 3×4 form or a QWERTY form. The user creates words one by one by using the keyboard, and in this case, creating every word one by one with the keyboard is quite inconvenient and cumbersome. In fact, both the 3×4 form and the QWERTY form have drawbacks in that the 3×4 keyboard sometimes requires multiple pressing of keys to select a single letter, and the QWERTY keyboard is very small on a portable terminal.

In particular, there may be a general phrase (or sentence), words frequently used by the user, emoticons, etc., in creating a short message, so newly inputting them each time through the keyboard wastes time for the user. In fact, many users, particularly the younger users, try to shorten the time it takes to create a message by abbreviating the text using single letters for some words, such as "c" for "see" and "U R" for "You are", etc. However, sometimes the abbreviated text is not completely understood at the receiving end.

Thus, there is a need in the art for a method that improves the convenience of sending short messages with a portable terminal.

SUMMARY OF THE INVENTION

The present invention provides a method for allowing a user to create a short message without having to input words one by one through a keyboard.

The present invention further provides a portable terminal adapted to the inventive method for allowing a user to create a short message without having to input words one by one through a keyboard.

In accordance with an exemplary embodiment of the present invention, the present invention provides a method for creating a short message of a portable terminal, the method preferably includes: extracting at least one word expected to be input from a database provided in the portable terminal when a message creation menu is selected; displaying at least one input expected word which has been extracted; recognizing that at least one word is selected from among the displayed at least one input expected word; and inputting the selected word to a text message creation window.

In accordance with another exemplary embodiment of the present invention, the present invention provides a portable terminal for automatically creating a short message preferably includes: a storage unit for storing at least one word; an input expected word extracting unit for extracting an input expected word among the at least one word stored in the storage unit; a priority determining unit for determining a priority level of the extracted input expected word; and a display unit for displaying the extracted input expected word according to the determined priority level in a text message creation window.

BRIEF DESCRIPTION OF THE DRAWINGS

The features and advantages of the present invention will become more apparent to a person of ordinary skill in the art from the following detailed description in conjunction with the accompanying drawings, in which:

FIG. 4a illustrates a screen shot of a word list database according to the first exemplary embodiment of the present invention;

FIG. 4b and FIG. 4c illustrate a screen shot of a word list database according to a second exemplary embodiment of the present invention;

FIG. 5b illustrates a screen shot with a changed input expected word list according to the first exemplary embodiment of the present invention;

DETAILED DESCRIPTION

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring appreciation of the subject matter of the present invention by a person of ordinary skill in the art. In embodiments of the present invention, it is preferable that a portable terminal is a mobile communication terminal capable of transmitting and receiving a short message.

Figure 1:
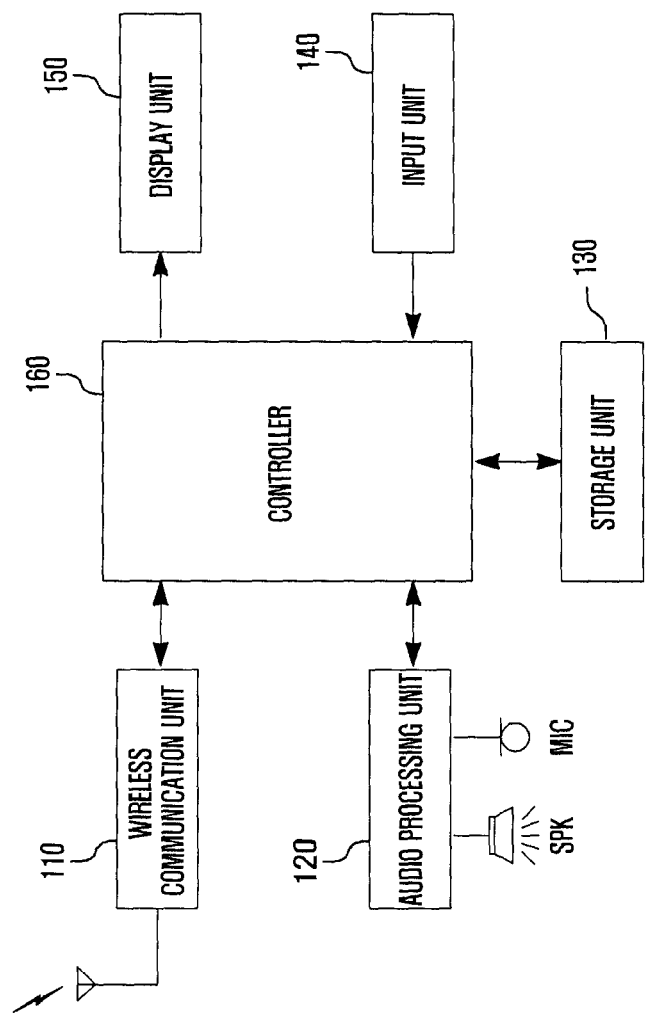
FIG. 1 is a schematic block diagram of a portable terminal for creating a short message according to an exemplary embodiment of the present invention.

FIG. 1 is a schematic block diagram of a portable terminal for creating a short message according to an exemplary embodiment of the present invention.

Referring now to FIG. 1, the portable terminal preferably includes a wireless communication unit 110, an audio processing unit 120, a storage unit 130, an input unit 140, a display unit 150, and a controller 160.

The wireless communication unit 110 may comprise a transceiver that transmits and receives corresponding data for radio communication of the portable terminal. The wireless communication unit 110 may include an RF transmitter for up-converting and amplifying the frequency of a transmitted signal and an RF receiver for low-noise-amplifying a received signal and down-converting the frequency of the amplified signal. Also, the wireless communication unit 110 may receive data via a radio channel and output the received data to the controller 180, and transmit data outputted from the controller 180 via a radio channel. The wireless communication unit 110 according to an exemplary embodiment of the present invention serves to transmit and receive a short message.

The audio processing unit 120 may be configured as a CODEC, and the CODEC may include a data CODEC for processing packet data etc. and an audio CODEC for processing an audio signal. The audio processing unit 130 converts a digital audio signal into an audio signal through the audio CODEC and reproduces it through a speaker SPK, and converts an analog audio signal input from a microphone MIC into a digital audio signal through the audio CODEC. The audio processing unit 120 according to an exemplary embodiment of the present invention may output a corresponding sound effect, such as an audible tone, when a short message is transmitted or received. Of course, a vibration of the unit, for example, is one possible variation regarding an audible tone. Also, when the controller 160 displays input expected words on the display unit 150 and one of the displayed input expected words is selected by a user, the audio processing unit 120 may output a corresponding sound effect.

Figure 2A:
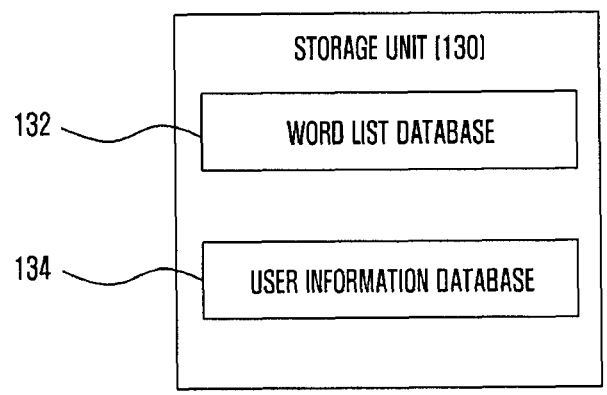
FIG. 2a is a schematic block diagram of a storage unit according to an exemplary embodiment of the present invention.

The storage unit 130 serves to store a program and data required to operate the portable terminal. The storage unit 130 according to an exemplary embodiment of the present invention preferably includes a word list database 132 and a user information database 134. FIG. 2a is a schematic block diagram of the storage unit according to an exemplary embodiment of the present invention.

The word list database 132 may be configured with words frequently used by the user in creating a short message or words stored when the portable terminal is manufactured. The words stored when the portable terminal manufactured could be in a variety of languages. The word list database 132 according to an exemplary embodiment of the present invention may store words repeatedly used by more than a pre-set number of times among words included in a text message list (e.g., an origination message list) created by the user. Also, the word list database 132 may store words starting from a word with the highest frequency of use to a pre-set rank among the words included in the origination message list. The word list database 132 according to an exemplary embodiment of the present invention may store words which are repeatedly used by more than the pre-set (predetermined) number of times or words with a higher frequency of use within a certain range. Also, the word list database 132 may store relevant words (e.g., relevant may be defined as "words which are frequently used together") by group. According to an exemplary embodiment of the present invention, the word list database 132 may store relevant words so that some words included in a reception message are matched to an input expected word. Also, the word list database 132 may store input expected words by classifying them according to each phone number to which a short message is to be transmitted. The word list database 132 according to an exemplary embodiment of the present invention may also store words that are generally frequently used in response to a customary phrase (or an idiom) by grouping them.

The user information database 134 refers to a database that stores personal information about the user (s) and basic information such as a phone book, schedule information, date and time information, and a call log. The words stored in the user information database 134 may be extracted as input expected words.

An input unit 140 receives a key manipulation signal from the user for controlling the portable terminal, and transfers the received key manipulation signal to the controller 180. The input unit 140 may be configured as a keypad including number keys and direction keys, and may be configured as a touch pad incase of a touch screen-based portable terminal. It is possible that the user could write the message by pressing a stylus against the touchpad. In case of a portable terminal having an image sensor, an acceleration sensor, etc., the sensors may correspond to the input unit 140. According to an exemplary embodiment of the present invention, the user may, for example, select a text message creation menu via the input unit 140, input an instruction for selecting one of the input expected words displayed on the display unit 150, and input an instruction for deleting some words from among the displayed input expected words.

The display unit 150 may be configured as a liquid crystal display (LCD) or any other type of thin-film-technology type of screen and visually provides menus of the portable terminal, input data, function setting information, and other information to the user. For example, the display unit 150 performs a function of outputting a booting screen image, a standby screen image (or an idle screen image), a display screen image, a call screen image, and other application execution screen images of the portable terminal. The display unit 150 according to an exemplary embodiment of the present invention serves to display input expected words and display a word selected by the user in a text message creation window.

The controller 160 controls a general operation of each element of the portable terminal. The controller 160, according to an exemplary embodiment of the present invention, preferably includes an input expected word extracting unit 162, a word priority determining unit 164, a message analyzing unit 166, and a word list database updating unit 168.

Figure 2B:
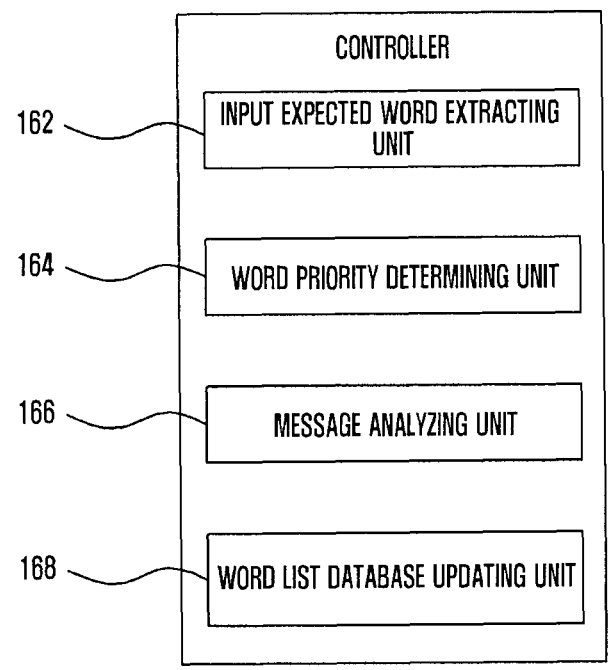
FIG. 2b is a schematic block diagram of a controller according to an exemplary embodiment of the present invention.

FIG. 2b is a schematic block diagram of the controller 160 according to an exemplary embodiment of the present invention.

Referring now to FIG. 2b, the input expected word extracting unit 162 serves to extract input expected words from the storage unit 130. The input expected word extracting unit 162 may extract the input expected words from the words stored in the word list database 132, or may also extract the input expected words from the words stored in the user information database 134. According to an exemplary embodiment of the present invention, the input expected word extracting unit 162 may extract input expected words directly from an origination and reception message list.

The word priority determining unit 164 serves to determine the priority levels of the input expected words extracted by the input expected word extracting unit 162. All the extracted input expected words may have the same priority level, or they may have different priority levels. The determined priority levels are related to the display order of the input expected words.

The message analyzing unit 166 analyzes a reception message received from the wireless communication unit 110 and transmits the analysis result to the input expected word extracting unit 162. The message analyzing unit 166 according to an exemplary embodiment of the present invention serves to check a phone number to which a short message is to be transmitted. Also, the message analyzing unit 166 serves to discriminate among sentences included in the reception message by sentence, by phrase, by word-phrase, byword or by special character, for example. When a sentence included in the reception message corresponds to a customary phrase stored in the storage unit 130, the message analyzing unit 166 may transmit the entire sentence as a key for extracting an input expected word, rather than discriminating the sentence by the words, to the input expected word extracting unit 162. The message analyzing unit 166 according to an exemplary embodiment of the present invention may determine whether or not the sentence included in the reception message corresponds to a declarative sentence or an interrogative sentence, based not only punctuation, but on words such as where, how, why, etc. Also, the message analyzing unit 166 according to an exemplary embodiment of the present invention may serve to discriminate among a particular sentence included in a currently created message by sentence, by phrase, by word-phrase, by word or by special character.

When the creation of the short message is completed, the word list database updating unit 168 serves to update the word list database 132 by reflecting the words included in the created short message.

Figure 3:
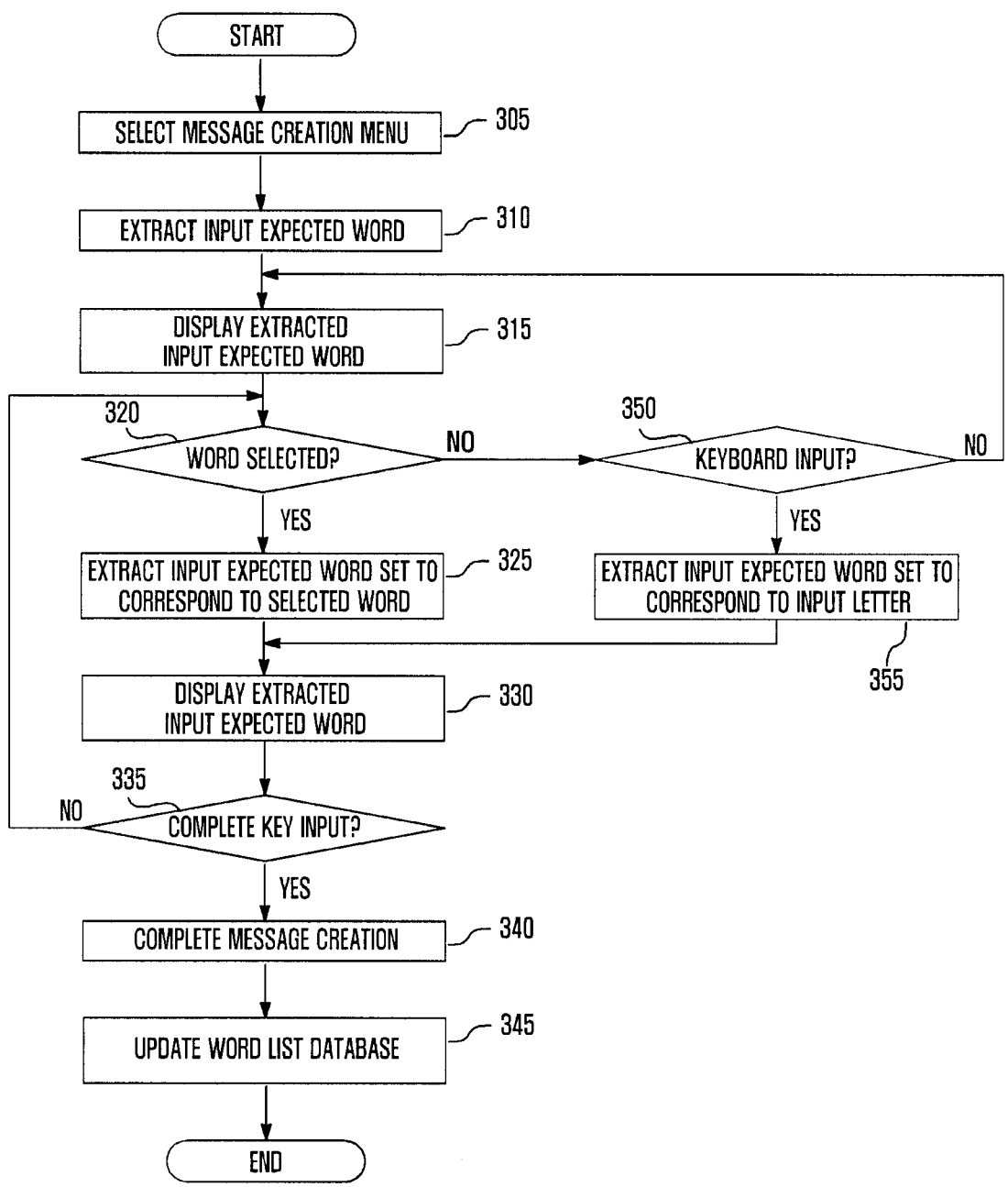
FIG. 3 is a flow chart illustrating exemplary operation of a process of creating a short message according to a first exemplary embodiment of the present invention.

FIG. 3 is a flow chart illustrating an exemplary operation of a process for creating a short message according to a first exemplary embodiment of the present invention.

Now referring to FIG. 3, at step (305) the controller 160 recognizes that the user selects the text message creation menu via the input unit 140.

At step (310), the input expected word extracting unit 162 extracts a word expected to be input from the storage unit 130. The input expected word extracting unit 162 may extract the input expected word from the word list database 132 or from the user information database 134. The input expected word extracting unit 162 may extract words with a high frequency of use (i.e. as compared with a threshold) stored in the word list database 132 in an initial screen state of the text message creation window (namely, in a state in which the user does not input any characters).

FIG. 4a illustrates an example of the word list database 132 according to the first exemplary embodiment of the present invention. The word list database 132 in FIG. 4a stores words such as 'OK', 'yup', 'got it', 'No', 'Yes', I got it', 'Nope', 'Call', 'Thank you', etc. These words may correspond to the words which are frequently used by more than the pre-set number of times among the short messages (i.e., short messages constituting the origination message list) created by the user, and may correspond to the words starting from the first ranked word with the highest frequency of use to the tenth ranked word. The number of words stored in the word list database 132 may be changed according to the capacity of the database, and the setting controlling the number of words in the word lost data base may be changed by the user. According to an exemplary embodiment of the present invention, the input expected word extracting unit 162 may extract, for example, all the words stored in the word list database 132 or may extract only some of them. For example, the input expected word extracting unit 162 may extract only five words with a high frequency of use from ten words stored in the word list database 132. Also, the input expected word extracting unit 162 may extract an input expected word from words originally stored in the portable terminal, in addition to the frequently used words.

Also, the input expected word extracting unit 162 may extract an input expected word directly from the origination and reception message list, rather than extracting a word from the word list database 132. For example, if fifty messages are stored in the origination message list, the input expected word extracting unit 162 may extract words with the frequency of use satisfying pre-set conditions (e.g., they have been repeatedly used more than a certain number of times) directly from the fifty stored messages.

In addition, the input expected word extracting unit 162 may extract an input expected word from the words stored in the user information database 134. The user information database 134 includes, for example, personal information of the user and basic information such as a phone book, schedule information, date and time information, and a call log, and the input expected word extracting unit 162 extracts a word or a sentence constituting the personal information of the user from the user information database 134. For example, if 'Birthday of Thomas' has been recorded in Mar. 25, 2009 in the schedule (or schedule management) menu when the user creates a short message in Mar. 25, 2009, the input expected word extracting unit 162 may extract 'Mar. 25, 2009' as input expected word and also extracts 'Thomas' and 'Birthday'.

At step (315), the controller 160 controls the display unit 150 to display the extracted input expected words. According to an exemplary embodiment of the present invention, the word priority determining unit 164 may determine priority levels of the words extracted by the input expected word extracting unit 162 and the controller 160 may control the display unit 150 to display the extracted input expected words according to the determined priority levels. For example, when the word priority determining unit 164 determines the priority levels of the extracted input expected words according to their respective frequencies of use, the controller 160 controls the display unit 150 to display the extracted words in the order starting from the one with the highest frequency of use. Also, the word priority determining unit 164 may determine, for example, the priority levels of the words extracted from the word list database 132 and the words extracted from the user information database 134. According to an exemplary embodiment of the present invention, the display unit 150 may discriminately display a text message creation region, an input expected word display region, and a keyboard display region. Also, the display unit 150 may discriminately display the words extracted from the word list database 132 and the words extracted from the user information database 134. The reference for determining the number and priority of words displayed in the input expected word display region may be set by the user. These words will facilitate a faster and easier response by the user.

Figure 5A:
FIG. 5a illustrates a text message creation screen shot according to the first exemplary embodiment of the present invention.

FIG. 5a illustrates a text message creation screen according to the first exemplary embodiment of the present invention. FIG. 5a displays the text message creation region, the input expected word display region, and the keyboard display region, and five input expected words are displayed in the input expected word display region.

Still referring to FIG. 3, at step (320), the controller 160 determines whether or not one of the input expected words displayed on the display unit 150 is selected by the user by controlling the input unit 140. When the input unit 140 is configured as a touch screen, the user touches region where a chosen word is selected. Also, the user may touch (or tap via a stylus) the region where the chosen word is selected and draw it to the text message creation region to input the corresponding word to the text message creation region.

When the input unit 140 is configured as a keypad, the user may select a word by using the direction keys etc. provided in the keypad. Also, according to an exemplary embodiment of the present invention, the user may input an instruction for deleting words determined to be unnecessary among the input expected words displayed on the display unit 150 from the input expected word list through the input unit 1400. The number of words that may be displayed in the input expected word region is typically limited, so the words extracted by the input expected word extracting unit 162 may not all be displayed on one screen. When the user inputs the instruction of deleting some words from the input expected word list through the input unit 140, the controller 160 controls the display unit 150 to delete the deletion-requested words from the input expected word list and display words from the next priority levels. Also, the controller 160 may control the display unit 150 to delete the deletion-requested words and not display words of the next priority levels according to a user setting.

At step (325), when one of the words is selected by the user at 320, the input expected word extracting unit 162 extracts words linked to the selected word. The input expected word extracting unit 162 may also extract the words from the word list database 132 or from the user information database 134 at 325. According to an exemplary embodiment of the present invention, the word list database 132 may store relevant words by grouping them.

For example, if the user frequently inputs 'OK' after 'yup', the word list database 132 groups 'yup' and 'OK' to store them. In this case, when 'yup' is selected by the user at step 320, the input expected word extracting unit 162 extracts 'OK' from the word list database 132. Also, when word form transformation words (i.e., words formed by transforming a word form) or meaning-related words (e.g., tense, singular form/plural form, an antonym, synonym, etc.) are linked and stored in the word list database 132, the input expected word extracting unit 162 extracts the words.

For example, if the word 'have' is displayed in the input expected word region and the user selects 'have', the input expected word extracting unit 162 extracts 'has', 'had', 'don't have', etc., the word form transformation words of 'have' from the word list database 132. The word form transformation words or meaning-related words may correspond to, for example, words stored in the storage unit 130 when the portable terminal is manufactured, or may correspond to words stored according to user input. Also, according to an exemplary embodiment of the present invention, the input expected word extracting unit 162 may extract a word linked to the selected word from the user information database 134. For example, when the user selects 'home' from among the input expected words, the input expected word extracting unit 162 may extract a phone number related to 'home' from the user information database 134.

At step (330), the controller 160 controls the display unit 150 to display the extracted input expected word. If a word not previously displayed at step 315 is newly extracted, the controller 160 controls the display unit 150 to display the newly extracted word at step 330. According to an exemplary embodiment of the present invention, the word priority determining unit 164 may determine the overall priority levels of the extracted words, and the display unit 150 may display the input expected words according to the determined priority levels. According to an exemplary embodiment of the present invention, the word priority determining unit 164 may determine the newly extracted word as a word with the highest priority level compared with the input expected word set to correspond to the selected word at step 325, and the display unit 150 may display the newly extracted word so that it is positioned at the top of the list of input expected words.

FIG. 5b illustrates a screen of a portable terminal with a changed input expected word list according to the first exemplary embodiment of the present invention. In FIG. 5b, as the user selects 'yup', 'OK' linked to 'yup' is displayed to be positioned first among the input expected words. According to an exemplary embodiment of the present invention, the word form transformation words, or the meaning-related words, may be displayed on a separate menu screen, rather than being displayed together in the input expected word region.

According to an exemplary embodiment, when a word linked to the word selected by the user has been already-extracted at step 310 or already-displayed at step 315, the word priority determining unit 164 readjusts the priority levels of the input expected words, and the controller 160 controls the display unit 150 to display the input expected words according to the adjusted priority levels. According to an exemplary embodiment of the present invention, the display unit 150 may display the linked words so that they are positioned at the top of the input expected word list. However, a person of ordinary skill understands and appreciates that the positioning of the linked words may be arranged differently than shown and described herein.

Now, at step (335), the controller 160 controls the input unit 140 to determine whether or not a creation completion key is input by the user.

When the creation completion key is input at 335, then at step (340) the controller 160 terminates the message creation process. Subsequently, the controller 160 controls the wireless communication unit 110 to transmit the created message to an external source according to a user instruction.

At step (345), the word list database updating unit 168 updates the word list database 132. The transmitted short message is stored in the origination message list, and the word list database updating unit 168 analyzes the words of the short messages included in the origination message list and newly configures the words stored in the word list database 132. The word list stored in the word list database 132 may be changed according to the word configuration included in the transmitted short message, or may remain the same.

Returning to step (320), if none of the input expected words displayed on the display unit 150 is selected at step, then at step (350) the controller 160 controls the input unit 140 to determine whether or not the keyboard is pressed. In the present invention, the term 'keyboard' comprises an input unit provided to input characters, which may be configured as a 3×4 pad or QWERTY pad form. The keyboard may be displayed on a portion of the display unit 150 based on a touch screen, or may be configured in a keypad form. When the user wants to input a new word in addition to the words displayed as the input expected words, he/she directly inputs characters through the keyboard. The controller 160 recognizes the characters input by the user via the input unit 140, and at step (355)

the input expected word extracting unit 162 extracts pre-set input expected words correspondingly according to the characters input by the user.

According to an exemplary embodiment of the present invention, at step (350), when a word linked to the character input by the user is stored in the word list database 132 or in the user information database 134, the input expected word extracting unit 162 may extract the input expected words from the word list database 132 or from the user information database 134.

For example, if the user inputs 'Thomas' through the keyboard at step 350, the input expected word extracting unit 162 may extract the phone number of 'Thomas' from the phone book of the user information database 134. Other information can be extracted in stead of or in addition the phone number. Also, when the user inputs 'Tomorrow' at step 350, the input expected word extracting unit 162 may extract 'March 26' corresponding to tomorrow's date. When the input expected word extracting unit 162 extracts the word, the controller 160 controls the display unit 150 to display the extracted input expected word at step 330 and performs the following process.

Figure 6:
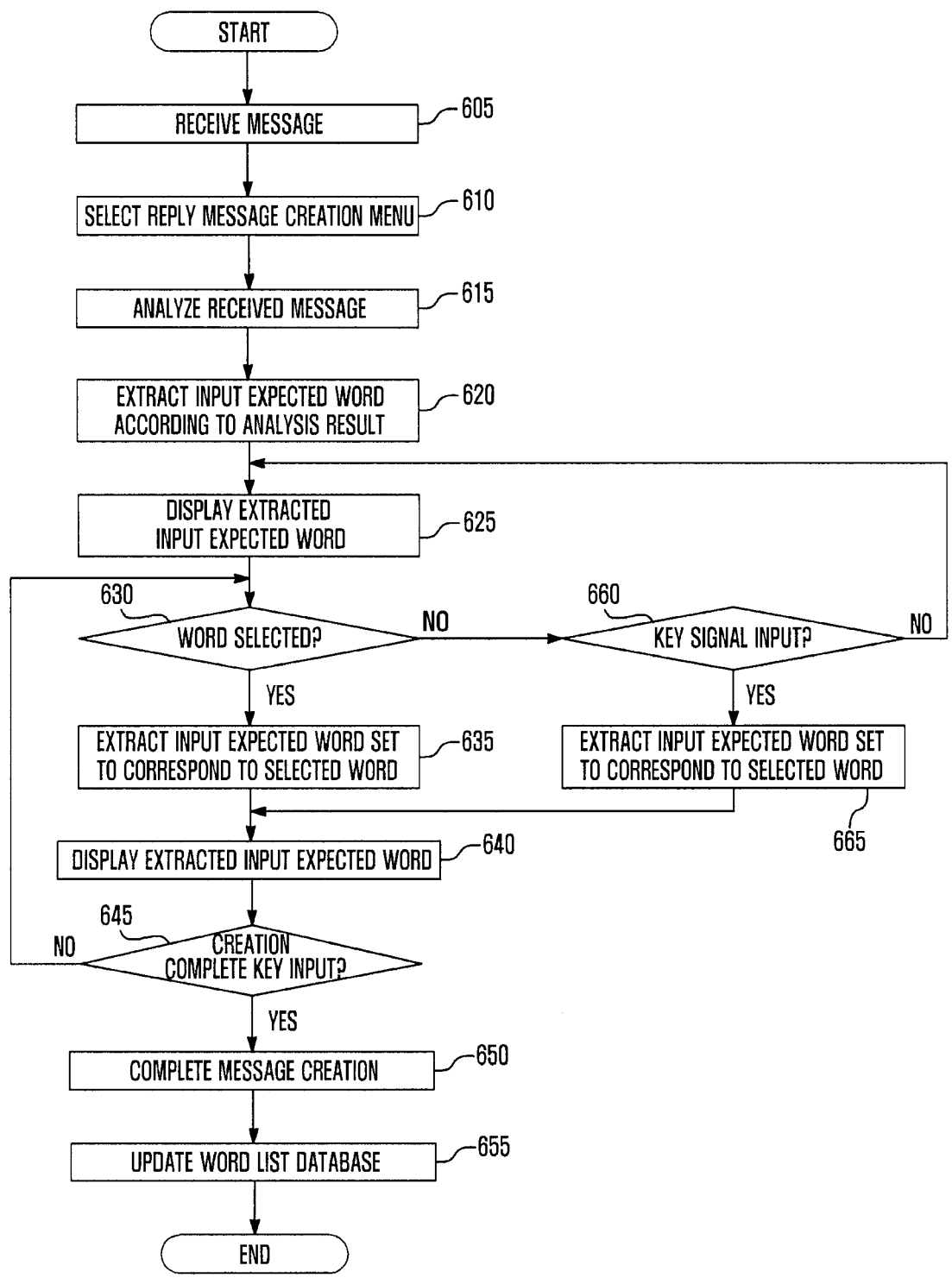
FIG. 6 is a flow chart illustrating exemplary operation of a process of creating a short message according to the second exemplary embodiment of the present invention.

FIG. 6 is a flow chart illustrating the process of creating a short message according to the second exemplary embodiment of the present invention.

Figure 7A:
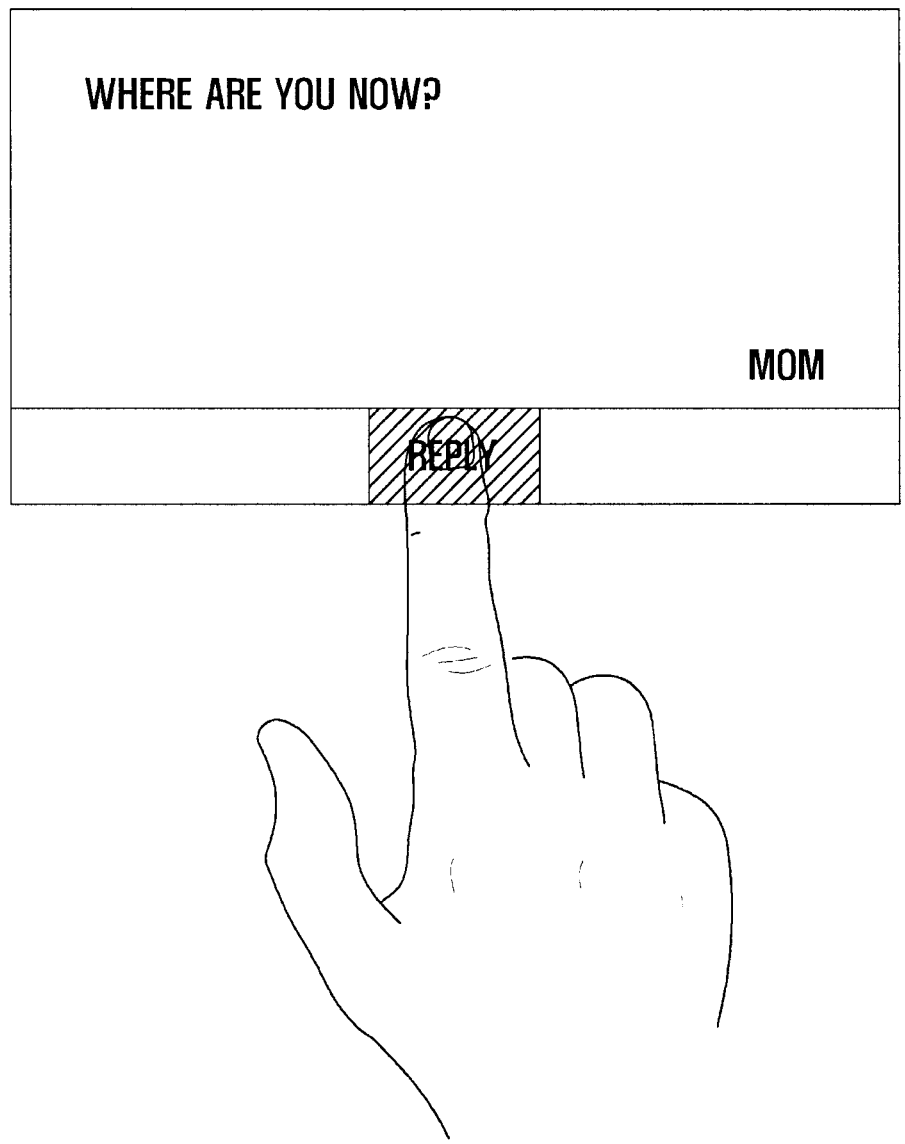
FIG. 7a illustrates a screen shot for select ing a reply message creation menu by a user according to the second exemplary embodiment of the present invention.

Referring now to FIG. 6, at step (605), the controller controls the wireless communication unit 110 to receive a short message. Subsequently, at step (610), the controller 160 controls the input unit 140 to determine whether or not a reply message creation menu is selected by the user. FIG. 7a is a screen shot for selecting the reply message creation menu by the user according to the second exemplary embodiment of the present invention.

At step (615), the message analyzing unit 166 analyzes the received message. The message analyzing unit 166 may recognize the received short message by sentence, by phrase, by word-phrase, by word or by special character. With reference to FIG. 7a, when a short message of 'Where are you now?' is received at step 605, the message analyzing unit 166 can recognize 'Where are you now?' as one sentence, and also recognizes the short message by discriminating it by the words such as 'You', 'Now', 'Where', 'Are', '?'. The sentence or phrase included in the reception message is customarily or commonly used, so when such customary sentence or phrase is stored in the word list database 132, the message analyzing unit 166 may recognize the short message by sentence or phrase, not by word. According to an exemplary embodiment of the present invention, the message analyzing unit 166 may determine a sentence form. For example, the message analyzing unit 166 may determine whether or not the sentences included in the reception message corresponds to interrogative sentences or declarative sentences. The message analyzing unit 166 analyzes the sentence form according to a pre-set algorithm, and determines whether or not the sentences are interrogative sentences or declarative sentences based on whether or not a question mark is included in the sentences, whether or not interrogatives (i.e., what, how, etc.) are positioned at the front of the sentences, and whether or not an auxiliary verb is positioned at the front of the sentences. Also, for example, if the sentence is an interrogative sentence, the message analyzing unit 166 may determine whether or not the sentence starts with an interrogative or with an auxiliary verb.

FIG. 4b and FIG. 4c illustrate the word list database according to the second exemplary embodiment of the present invention. FIG. 4b illustrates the word list database 132 storing input expected words corresponding to the words included in the reception message. In FIG. 4b, 'Me', 'You', and 'Mom' are stored as input expected words corresponding to 'Who', 'Tomorrow', 'Today', and '12 o'clock' are stored as input expected words corresponding to 'When' and 'At what time', and 'Home', 'Office', and 'School' are stored as input expected words corresponding to 'Where'. Words related to people, words related to time, and words related to an area are stored in the storage unit 130 when the portable terminal is manufactured, and the word list database updating unit 168 may select the words with the high frequency of use from the previously stored words and store the same in the word list database 132. For example, 'Me', 'You', 'Dad', 'Mom', etc., are stored as words meaning people, and when the user frequently uses 'Me', 'You', and 'Mom', the word list database 132 stores Me', 'You', and 'Mom'.

According to an exemplary embodiment of the present invention, the user may directly register an input expected word. For example, when the user wants to add the name 'Thomas' to the word list database 132, the user may edit the word list database 132 by using a word list database update menu provided in the portable terminal. Key words for extracting the input extracted words from the words included in the reception message are 'Who', 'When', Where', etc. With reference to FIG. 7a, the message analyzing unit 166 determines 'Where' among the words included in the reception message, as a key word.

In the second exemplary embodiment of the present invention, the message analyzing unit 166 may determine where messages are sent. The message analyzing unit 166 may check a phone number that is to receive a created message, and transmit the same to the input expected word extracting unit 162. FIG. 4c illustrates the word list database 132 storing input expected words discriminated according to phone numbers which are to receive a message. According to the present exemplary embodiment, the word list database updating unit 168 primarily discriminates messages according to phone numbers which are to receive a message and secondarily discriminates among the messages according to key words included in the reception message for extracting the input expected words. In this case, the message analyzing unit 166 transmits the phone number to which the message is to be transmitted and the information regarding the key words included in the reception message to the input expected word extracting unit 162.

At step (620), the input expected word extracting unit 162 extracts input expected words from the words stored in the storage unit 130. According to the second exemplary embodiment of the present invention, the input expected word extracting unit 162 may extract the words stored in the word list database 132 or the words stored in the user information database 134. When the input expected word extracting unit 162 receives only the information regarding the key word included in the reception message from the message analyzing unit 166, it extracts input expected words previously set to correspond to the key word. Also, the input expected word extracting unit 162 may extract words with a high frequency of use in addition to the input expected words previously set to correspond to the key word included in the reception message. For example, with reference to FIG. 4b, the input expected word extracting unit 162 may also extract 'OK', 'Yup', 'Got it', etc., in addition to 'Home', 'Office', 'School' previously set to correspond to 'Where'. Also, the input expected word extracting unit 162 may extract words included in the reception message. In many cases, the words included in the reception message are frequently used in a reply message, so the input expected word extracting unit 162 extracts the words used in the reception message.

If a sentence or a phrase included in the reception message is stored as a customary sentence or phrase in the word list database 132, the input expected word extracting unit 162 extracts stored words that correspond to the customary sentence or phrase. For example, when 'I'm', 'fine', 'thank', and 'you' are stored to correspond to the customary phrase 'How are you?' as shown in FIG. 4, the input expected word extracting unit 162 extracts the stored words. Also, when a sentence included in the reception message is analyzed as an interrogative sentence starting with an auxiliary verb by the message analyzing unit 166, the input expected word extracting unit 162 extracts a 'Yes' or 'No' stored to correspond thereto.

When the input expected word extracting unit 162 receives phone number information to which a message is to be transmitted and information regarding a key word included in the reception message together from the message analyzing unit 166, the input expected word extracting unit 162 may extract input expected words stored to correspond to the phone number information. For example, as shown in FIG. 4c, when the phone number to which a message is to be transmitted is '010-8856-7776' and the key word included in the reception message is 'Where', the input expected word extracting unit 162 extracts 'Home' and may also extract the words 'OK', 'Yup', and 'Got it'. The input expected words stored in the word list database 132 may be updated according to the frequency of use (i.e., how frequently the user uses them), or may be changed as the user can also directly sets the stored words. Also, the input expected word extracting unit 162 may extract the entire word stored in the word list database 132 or only some of them.

According to an exemplary embodiment of the present invention, the input expected word extracting unit 162 may extract the input expected words directly from the origination or reception message list, not from the word list database 132. Namely, the input expected word extracting unit 162 may extract words with a frequency of use satisfying certain conditions from the words included in the origination message list and may extract words included in the reception message list. Also, the input expected word extracting unit 162 may extract input expected words from the user information database 134. For example, when a particular name is included in the reception message, the input expected word extracting unit 162 may extract a phone number corresponding to the name from the user information database 134.

At step (625), the controller 160 controls the display unit 150 to display the extracted input expected words. Also, in the second exemplary embodiment of the present invention, the word priority determining unit 164 may determine the priority levels of the input expected words extracted from the input expected word extracting unit 162 and the controller 160 may control the display unit 150 to display the input expected words according to the determined priority levels. In an exemplary embodiment of the present invention, the display unit 150 may discriminately display one or more of a text message creation region, an input expected word display region, and a keyboard display region. Also, the display unit 150 may discriminately display the words stored in the word list database 132 and the words stored in the user information database 134.

Figure 7B:
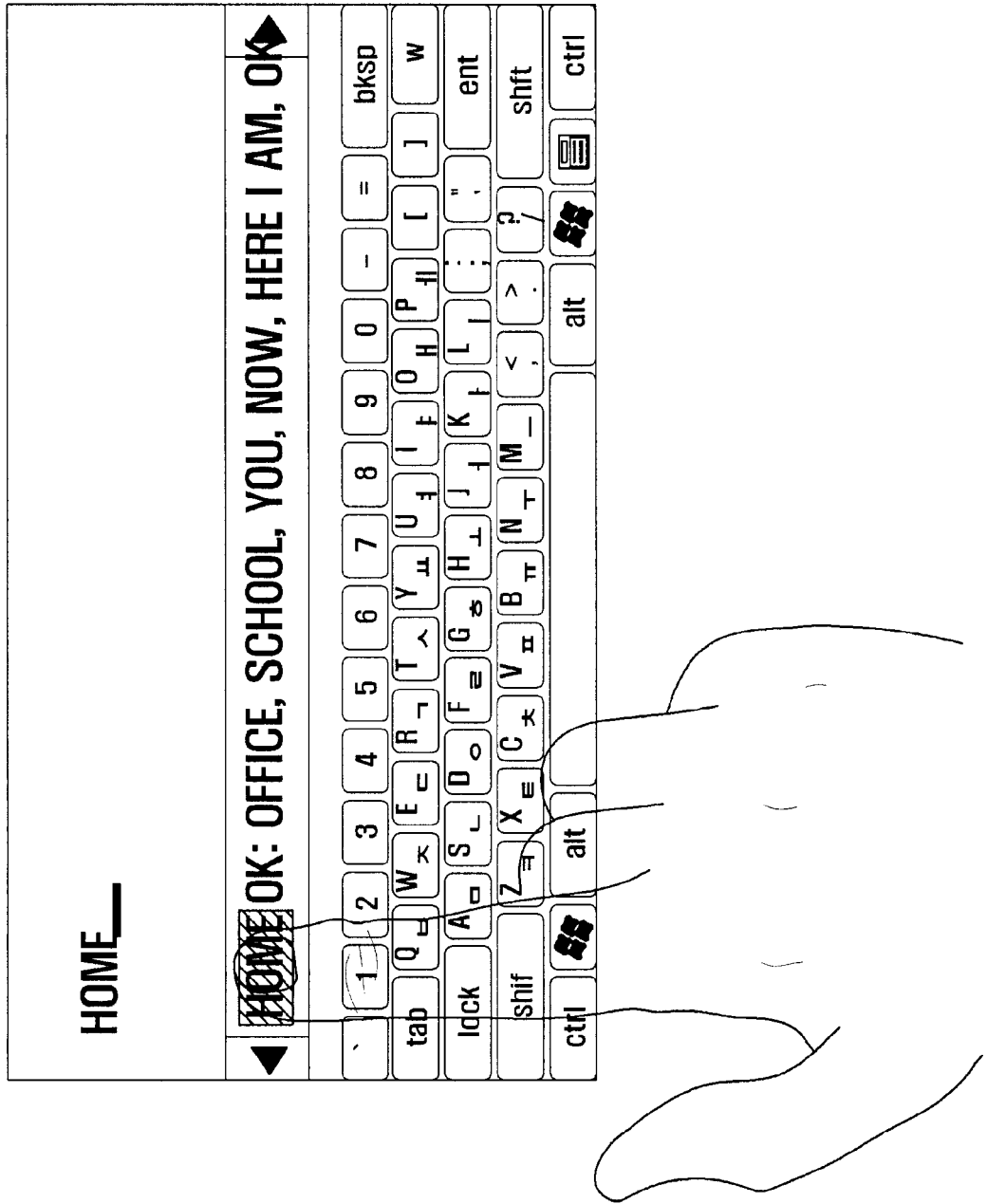
FIG. 7b illustrates a text message creation screen on a display of a portable terminal according to the second exemplary embodiment of the present invention.

FIG. 7b is a display of a text message creation screen according to the second exemplary embodiment of the present invention. The input expected word display region in FIG. 7b includes words extracted by the input expected word extracting unit 162. In FIG. 7b, 'Home', 'Office', and 'School' indicate the results obtained by extracting the words stored to correspond to the key word 'Where' of the reception message from the word list database 132 in FIG. 4b. In FIG. 7b, 'You', 'Now', 'Are' are words extracted from the received short message 'Where are you now?' Also, 'OK' is a word extracted from the word list ('OK', 'Yup', 'Got it', 'No', 'Yes', 'I got it') with the high frequency of use in addition to the words previously set to correspond to the key word of the reception message from the word list database 132 of FIG. 4b. The word priority determining unit 164 determines the priority levels of the extracted words, and the reference based on which the priority levels are determined may be changed according to a setting. According to an exemplary embodiment of the present invention, the number of input expected words displayed on the display unit 150 may be changed according to a user-changeable setting. Also, the input expected words displayed on the display unit 150 may include only the words stored to correspond to the key word of the reception message or may include words with a high frequency of user in addition to the words stored to correspond to the key word of the reception message according to a user setting. Also, the input expected words may include only the words extracted from the user information database 134 according to a user setting.

Figure 7C:
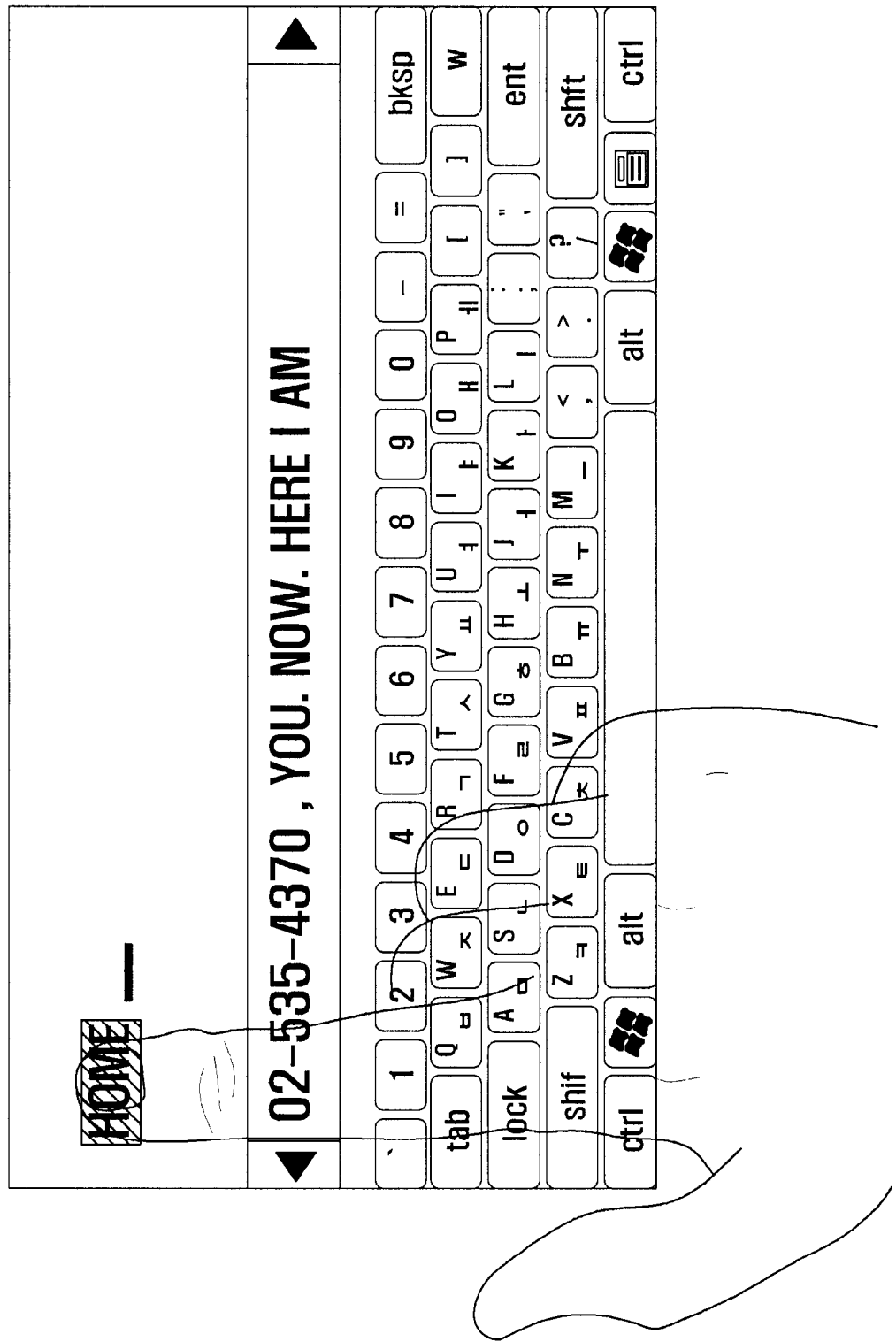
FIG. 7c illustrates a screen with a changed input expected word list according to the second exemplary embodiment of the present invention.

The controller 160 controls input unit 140 to determine whether or not one of the input expected words displayed on the display unit 150 is selected by the user (630). When one of the words is selected by the user, the input expected word extracting unit 162 extracts words linked to the selected word at step 625. Also, the input expected word extracting unit 162 may extract the linked words from the word list database 132 or from the user information database 134 at step 625. When 'Yup' and 'OK' are stored in a group in the word list database 132, if 'Yup' is selected by the user at step 630, the input expected word extracting unit 162 extracts 'OK' from the word list database 132. According to an exemplary embodiment of the present invention, the input expected word extracting unit 162 may extract the word set to correspond to the word selected at step 630 from the user information database 134. As shown in FIG. 7c, when the user selects 'home', the input expected word extracting unit 162 may extract a phone number related to 'home' from the user information database 134. Also, in the second exemplary embodiment, the user may delete a word determined to be unnecessary among the input expected words displayed on the display unit 150, and accordingly, the input expected word extracting unit 162 may extract a new word as an input expected word and the word priority determining unit 164 may readjust the priority levels of the extracted input expected words.

At step (640), the controller 160 may control the display unit 150 to display the extracted input expected words. If a word not displayed at step (625) is newly extracted, the controller 160 controls the display unit 150 to display the newly extracted word at step 640. According to an exemplary embodiment of the present invention, the word priority determining unit 164 may determine the newly extracted word as a word with the highest priority level compared with the words extracted at step 620, and the controller 160 may control the display unit 150 to display the newly extracted word so that it is positioned at the top of the list of input expected words.

According to an exemplary embodiment of the present invention, if the word linked to the word input by the user has been already extracted as an input expected word, the controller 160 cause display of the linked word so that the linked word is positioned at the top of the list of input expected words at step 640. FIG. 7c illustrates a screen with an input expected word list changed as the user selects 'Home' according to the second exemplary embodiment of the present invention. The input expected word extracting unit 162 extracts a phone number stored to correspond to 'Home' from the phone book of the user information database 134, the word priority determining unit 164 determines the extracted phone number to have the highest priority level, and the controller 160 controls the display unit 150 to display the extracted phone number in the input expected word region of the display unit 150. In the input expected word region of FIG. 7c, '02-535-4370' is displayed to be positioned at the top of the list.

At step (645), the controller 160 controls the input unit 140 to determine whether or not a creation completion key is input by the user.

When the creation completion key is input, at step (650) the controller 160 terminates the message creation process. Subsequently, the controller 160 controls the wireless communication unit 110 to transmit the created message to an external portable terminal according to a user instruction.

At step (655), the word list database updating unit 168 updates the word list database 132. The transmitted short message is stored in the origination message list, and the word list database updating unit 168 analyzes the words of the short messages included in the origination message list and newly configures the words stored in the word list database 132. The word list stored in the word list database 132 may be changed according to the word configuration included in the transmitted short message, or may remain the same.

If none of the input expected words displayed on the display unit 150 are selected at 630, at step (660) the controller 160 controls the input unit 140 to determine whether or not the keyboard is pressed. The controller 160 recognizes characters input by the user via the input unit 140, and at step (665) the input expected word extracting unit 162 extracts pre-set input expected words correspondingly according to the character input by the user.

According to an exemplary embodiment of the present invention, when a word linked to the character input by the user is stored in the word list database 132, or in the user information database 134 at step 660, the input expected word extracting unit 162 extracts the input expected words from the word list database 132 or from the user information database 134. When the input expected word extracting unit 162 extracts the word, the controller 160 controls the display unit 150 to display the extracted input expected word at step 640 and performs the following process.

According to this exemplary embodiment of the present invention, the user can create a short message without having to input words one-by-one through a keyboard. Thus, the user can create a short message through a smaller number of key inputs or touch inputs, and the time taken for creating the short message can be shortened. In addition, because a sentence is created upon receiving a list of words expected to be input, a sensitive portable terminal using method can be provided to the user.

Although exemplary embodiments of the present invention have been described in detail hereinabove, it should be understood that many variations and modifications of the basic inventive concept herein described, which may will still fall within the spirit and scope of the exemplary embodiments of the present invention as defined in the appended claims.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor Or the programmable hardware include memory components, e.g., RAM, ROM, Flash, etc. that may store or receive software or computer code that when accessed and executed by the computer, processor or hardware implement the processing methods described herein.

What is claimed is:

1. A method for creating a message by a portable terminal comprising a display unit having at least one of an input expected word display region or a text message creation display region, the method comprising:

extracting by a controller one or more input expected words from a database comprised of frequently used words provided in the portable terminal when a message creation menu is selected;

displaying, at the input expected word display region, the one or more input expects words that have been extracted;

in response to determining by the controller that a first word displayed at the input expected word region has been selected from among said one or more input expected words, extracting at least one relevant word linked to the selected word, and displaying the extracted one or more relevant words at the input expected word display region according to a priority level of the one or more extracted input expected word; and displaying the first word at the text message creation display region, wherein the one or more relevant words comprise a word or phrase that is frequently used together with the selected word, wherein the database comprises a word list database including words with a usage frequency number in one or more short messages that is larger than a pre-set number and a user information database including at least one of a phone book and schedule information.

2. The method of claim 1, further comprising:
   updating word information included in the database to reflect the first word.

3. The method of claim 1, wherein the message creation menu corresponds to a reply message creation menu.

4. The method of claim 3, further comprising:
   receiving a short message from an external source; and
   analyzing the received short message for at least one of content and syntax,
   wherein one or more input expected words set to correspond to the analyzed short message are extracted from the database.

5. The method of claim 1, wherein the word list database stores a plurality of words grouped by the one or more relevant words.

6. The method of claim 1, wherein the word list database stores at least one sentence, a phrase, a word-phrase, or a word included in a reception message by matching input expected words with said at least one sentence, a phrase, a word-phrase, or a word included in a reception message.

7. The method of claim 1, wherein the word list database stores input expected words according to each phone number to which a short message is sent.

8. The method of claim 4, wherein analyzing the received short message includes dividing the received short message into sentences, phrases, word-phrases, words, or special words.

9. The method of claim 4, wherein analyzing the received short message includes analyzing a sentence form of at least one sentence included in the received short message.

10. The method of claim 1, wherein extracting the one or more input expected words comprises:
   determining a priority of the one or more input expected words which has been extracted.

11. The method of claim 10, further comprising:
   displaying an input expected word with a subsequent priority level when a command for deleting a portion of the one or more input expected words with the determined priority is input.

12. A portable terminal for creating a short message, comprising:
   a storage unit for storing a database comprised of: frequently used words and for storing one or more relevant words linked to a word that is selected by a user;
   an input expected word extracting unit for extracting one or more input expected words among the frequently used words stored in the storage unit, and for extracting one or more relevant words linked to the word that is selected by the user;
   a controller for recognizing the word from among the one or more input expected words;
   a priority determining unit for determining a priority level of the extracted input expected word; and
   a display unit, having at least one of an input expected word display region or a text message creation display region, for displaying the word at input expected word display region according to the determined priority level and for displaying the one or more extracted relevant words at the input expected word display region, wherein the one or more extracted relevant words are displayed according to a priority level of an extracted input word at the input expected word display region,
   wherein the one or more relevant words comprise a word or phrase that is frequently used together with the selected word,
      wherein the database comprises a word list database including words with a usage frequency number in one or more short messages that is larger than a pre-set number and a user information database including at least one of a phone book and schedule information.

13. The portable terminal of claim 12, further comprising:
   an updating unit for updating a list of the one or more input expected words stored in the storage unit according to the word selected by the user from among a plurality of displayed input expected words.

14. The portable terminal of claim 12, further comprising:
   a message analyzing unit for discriminating a received short message by sentence, by phrase, by word-phrase, by word or by special character, or analyzing a sentence form included in the received short message so that a short message is created that is responsive to the received short message.

15. The portable terminal of claim 14, wherein the message analyzing unit analyzes the received short message for at least one of content and syntax.

16. The portable terminal of claim 12, wherein the display unit displays a reply message creation menu.

17. The portable terminal of claim 16, further comprising:
   a controller for receiving an incoming short message from an external source, and for analyzing the received incoming short message for at least one of content and syntax;
   wherein the input expected word extracting unit extracts the one or more input expected words to correspond to the analyzed incoming short message.

18. The portable terminal of claim 17, wherein the controller analyzes the received incoming short message to divide the received short message into sentences, phrases, word-phrases, words, or special words.

19. The portable terminal of claim 17, wherein the controller analyzes a sentence form of at least one sentence included in the received incoming short message.

* * * * *

UNITED STATES PATENT AND TRADEMARK OFFICE
CERTIFICATE OF CORRECTION

| | | |
|---|---|---|
| PATENT NO. | : 8,843,164 B2 | Page 1 of 1 |
| APPLICATION NO. | : 12/702462 | |
| DATED | : September 23, 2014 | |
| INVENTOR(S) | : Hyun Jung Baek | |

It is certified that error appears in the above-identified patent and that said Letters Patent is hereby corrected as shown below:

In the Claims

Column 14, Claim 1, Line 17 should read as follows:
--...input expected words that...--

Signed and Sealed this
Sixteenth Day of December, 2014

Michelle K. Lee
*Deputy Director of the United States Patent and Trademark Office*